US010681686B2

(12) United States Patent
Ji et al.

(10) Patent No.: US 10,681,686 B2
(45) Date of Patent: Jun. 9, 2020

(54) METHOD FOR TRANSMITTING DOWNLINK FEEDBACK INFORMATION, BASE STATION, AND TERMINAL DEVICE

(71) Applicant: HUAWEI TECHNOLOGIES CO., LTD., Shenzhen (CN)

(72) Inventors: Tong Ji, Beijing (CN); Yiling Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/022,731

(22) Filed: Jun. 29, 2018

(65) Prior Publication Data
US 2018/0310288 A1    Oct. 25, 2018

Related U.S. Application Data

(63) Continuation of application No. PCT/CN2015/100212, filed on Dec. 31, 2015.

(51) Int. Cl.
*H04W 72/04* (2009.01)
*H04W 88/08* (2009.01)
(Continued)

(52) U.S. Cl.
CPC ........... *H04W 72/042* (2013.01); *H04L 1/001* (2013.01); *H04L 1/0004* (2013.01);
(Continued)

(58) Field of Classification Search
CPC .... H04L 5/0057; H04W 24/10; H04W 72/042
See application file for complete search history.

(56) References Cited

U.S. PATENT DOCUMENTS

2012/0082124 A1\* 4/2012 Kwon ................... H04L 5/0007
                                                          370/329
2012/0236799 A1    9/2012 Dai et al.
(Continued)

FOREIGN PATENT DOCUMENTS

CN        101605356 A       12/2009
CN        101651996 A        2/2010
(Continued)

OTHER PUBLICATIONS

3GPP TS 36.212 V12.6.0 (Sep. 2015);3rd Generation Partnership Project;Technical Specification Group Radio Access Network;Evolved Universal Terrestrial Radio Access (E-UTRA);Multiplexing and channel coding(Release 12),total 95 pages.
(Continued)

*Primary Examiner* — Ayaz R Sheikh
*Assistant Examiner* — Debebe A Asefa
(74) *Attorney, Agent, or Firm* — Kilpatrick Townsend & Stockton LLP

(57) ABSTRACT

The present disclosure discloses a method for transmitting downlink feedback information, a base station, and a terminal device, so as to ensure that the base station correctly receives the downlink feedback information sent by the terminal device, thereby effectively improving a transmission success rate of the downlink feedback information. In embodiments of the present disclosure, the method includes: sending, by the base station, indication information to the terminal device, where the indication information is used to indicate a target time-frequency resource location, the target time-frequency resource location is a time-frequency resource location at which the terminal device sends the downlink feedback information, and the downlink feedback information is used to feed back a reception status of downlink data that should be received by the terminal
(Continued)

device; and receiving, by the base station, the downlink feedback information sent by the terminal device.

20 Claims, 4 Drawing Sheets

(51) Int. Cl.
*H04L 1/00* (2006.01)
*H04L 1/18* (2006.01)
*H04L 5/00* (2006.01)

(52) U.S. Cl.
CPC .......... *H04L 1/1861* (2013.01); *H04L 1/1864* (2013.01); *H04L 1/1893* (2013.01); *H04L 1/1896* (2013.01); *H04L 5/0055* (2013.01); *H04W 72/04* (2013.01); *H04W 88/08* (2013.01); *H04L 5/0007* (2013.01); *H04L 5/0053* (2013.01)

(56) References Cited

U.S. PATENT DOCUMENTS

| | | | |
|---|---|---|---|
| 2012/0250663 | A1 | 10/2012 | Han et al. |
| 2012/0281654 | A1* | 11/2012 | Aiba .................... H04L 5/0007 370/329 |
| 2013/0135988 | A1 | 5/2013 | Kim et al. |
| 2013/0170462 | A1 | 7/2013 | Seo et al. |
| 2014/0071864 | A1 | 3/2014 | Seo et al. |
| 2014/0119249 | A1 | 5/2014 | Park |
| 2014/0192757 | A1 | 7/2014 | Lee et al. |
| 2016/0127068 | A1 | 5/2016 | Ahn et al. |
| 2017/0280426 | A1 | 9/2017 | Takeda et al. |
| 2018/0278400 | A1 | 9/2018 | Chen et al. |

FOREIGN PATENT DOCUMENTS

| | | |
|---|---|---|
| CN | 101778462 A | 7/2010 |
| CN | 102065545 A | 5/2011 |
| CN | 103298118 A | 9/2013 |
| CN | 104620654 A | 5/2015 |
| JP | 2012147460 A | 8/2012 |
| JP | 2013545421 A | 12/2013 |
| JP | 2014161045 A | 9/2014 |
| JP | 2014239447 A | 12/2014 |

OTHER PUBLICATIONS

3GPP TS 36.213 V12.7.0 (Sep. 2015),3rd Generation Partnership Project;Technical Specification Group Radio Access Network;Evolved Universal Terrestrial Radio Access (E-UTRA);Physical layer procedures(Release 12),dated Sep. 2015,total 241 pages.
3GPP TS 36.211 V12.8.0 (Dec. 2015), 3rd Generation Partnership Project; Technical Specification Group Radio Access Network; Evolved Universal Terrestrial Radio Access (E-UTRA); Physical channels and modulation(Release 12), 136 pages.
NTT DoCoMo, Inc., Remaining details for PUCCH format and PUCCH resource selection for HARQ-ACK feedback, 3GPP TSG RAN WG1 Meeting #83 R1-157229, 3GPP, Nov. 7, 2015, pp. 1-4.
XP051003486 R1-157284 Ericsson,"Remaining details on HARQ-ACK codebook adaptation for CA enhancement",3GPP TSG RAN WG1 Meeting #83,Anaheim, USA, Nov. 15-22, 2015,total 4 pages.
XP051022707 R1-157229 NTT DoCoMo, Inc.,"Remaining details for PUCCH format and PUCCH resource selection for HARQ-ACK feedback",3GPP TSG RAN WG1 Meeting #83,Anaheim, USA, Nov. 15-22, 2015, total 4 pages.

* cited by examiner

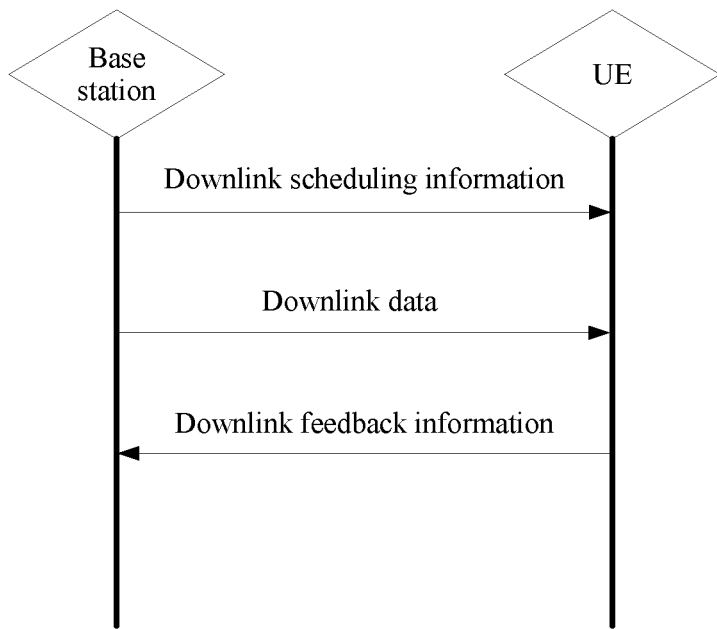

FIG. 1

A base station sends indication information to user equipment UE, where the indication information is used to indicate a target time-frequency resource location, the target time-frequency resource location is a time-frequency resource location at which the UE sends downlink feedback information, and the downlink feedback information is used to feed back a reception status of downlink data that should be received by the UE — 101

The base station receives the downlink feedback information sent by the UE — 102

FIG. 2

METHOD FOR TRANSMITTING DOWNLINK FEEDBACK INFORMATION, BASE STATION, AND TERMINAL DEVICE

CROSS-REFERENCE TO RELATED APPLICATIONS

This application is a continuation of International Application No. PCT/CN2015/100212, filed on Dec. 31, 2015, the disclosure of which is hereby incorporated by reference in its entirety.

TECHNICAL FIELD

The present disclosure relates to the field of communications technologies, and in particular, to a method for transmitting downlink feedback information, a base station, and a terminal device.

BACKGROUND

With rapid development of machine-to-machine (Full name: Machine to Machine, M2M for short) communications applications, market requirements and the market scale explosively grow. An M2M communications application has a service requirement different from that of a conventional communications service, such as deep coverage and low power consumption. The following solution is put forward for the service requirement of the M2M communications application: After receiving downlink data sent by a base station on a physical downlink shared channel (Full name: Physical Downlink Shared Channel, PDSCH for short), a terminal device needs to provide feedback for the downlink data. If the terminal device successfully receives the downlink data, the terminal device feeds back an acknowledgement (Full name: Acknowledgement, ACK for short); or if the terminal device fails to receive the downlink data, the terminal device feeds back a negative acknowledgement (Full name: Negative Acknowledgement, NACK for short). For example, a data transmission process may be shown in FIG. 1.

Currently, in the data transmission process in FIG. 1, a time-frequency resource location of downlink feedback information is mainly mapped by using a time-frequency resource location of a physical downlink control channel (Full name: Physical Downlink Control Channel, PDCCH for short), so that the time-frequency resource location of the downlink feedback information is determined, and the downlink data sent on the PDSCH is fed back at the time-frequency resource location of the downlink feedback information.

However, for a system in which cross-PDCCH scheduling is performed, if the time-frequency resource location of the downlink feedback information is mapped by using the time-frequency resource location of a PDCCH, a resource conflict may occur because feedback is provided for multiple pieces of the downlink data at a same time-frequency resource location of the downlink feedback information. Consequently, the base station cannot correctly receive the downlink feedback information sent by a terminal device, and a transmission success rate of the downlink feedback information is not high.

SUMMARY

Embodiments of the present disclosure provide a method for transmitting downlink feedback information, a base station, and a terminal device, so as to ensure that the base station correctly receives the downlink feedback information sent by the terminal device, thereby effectively improving a transmission success rate of the downlink feedback information.

In view of this, a first aspect of the present disclosure provides a method for transmitting downlink feedback information, including:

to avoid a resource conflict caused because feedback is provided for multiple pieces of downlink data at a same time-frequency resource location of the downlink information, sending, by a base station, indication information to a terminal device, where the indication information is used to indicate a target time-frequency resource location, the target time-frequency resource location is a time-frequency resource location at which the terminal device sends the downlink feedback information, and the downlink feedback information is used to feed back a reception status of downlink data that should be received by the terminal device; and receiving, by the base station, the downlink feedback information sent by the terminal device.

It should be noted that a time-frequency resource location at which a terminal device sends downlink feedback information is indicated by a base station by using indication information, and the base station can ensure, by using the indication information, that time-frequency resource locations of downlink feedback information of different downlink data are different, so as to avoid a resource conflict problem in the prior art. Therefore, in the present disclosure, it can be ensured that the base station correctly receives the downlink feedback information sent by the terminal device, thereby effectively improving a transmission success rate of the downlink feedback information.

With reference to the first aspect of the present disclosure, in a first implementation of the first aspect of the present disclosure, the method further includes:

sending, by the base station, downlink scheduling information to the terminal device; and after the sending, by a base station, indication information to a terminal device, the method further includes:

sending, by the base station, the downlink data to the terminal device according to the downlink scheduling information.

It should be noted that the indication information and the downlink scheduling information are not sent in sequence; that is, the indication information and the downlink scheduling information may be sent in a same message or may be separately sent.

With reference to the first aspect of the present disclosure, in a second implementation of the first aspect of the present disclosure, the sending, by a base station, indication information to a terminal device includes:

sending, by the base station, on a physical downlink control channel PDCCH, the indication information to the terminal device, where the PDCCH includes multiple scheduling units, and the indication information alone occupies one scheduling unit on the PDCCH; and the scheduling unit includes information about the time-frequency resource location of the downlink feedback information.

With reference to the first implementation of the first aspect of the present disclosure, in a third implementation of the first aspect of the present disclosure, the sending, by a base station, indication information to a terminal device includes:

sending, by the base station, on a physical downlink control channel PDCCH, the indication information to the terminal device, where the PDCCH includes multiple scheduling units, and the indication information shares one scheduling unit with the downlink scheduling information.

With reference to the first aspect of the present disclosure, in a fourth implementation of the first aspect of the present disclosure, before the sending, by a base station, indication information to a terminal device, the method includes:

sending, by the base station, downlink scheduling information to the terminal device; and sending, by the base station, the downlink data to the terminal device according to the downlink scheduling information.

With reference to the first aspect of the present disclosure, the first implementation of the first aspect of the present disclosure, the second implementation of the first aspect of the present disclosure, the third implementation of the first aspect of the present disclosure, or the fourth implementation of the first aspect of the present disclosure, in a fifth implementation of the first aspect of the present disclosure, the receiving, by the base station, the downlink feedback information sent by the terminal device includes:

receiving, by the base station, the downlink feedback information sent by the terminal device, where the downlink feedback information is a sequence; and the downlink feedback information represents an acknowledgement ACK or a negative acknowledgement NACK separately by using different sequences, and a sequence that represents the ACK and a sequence that represents the NACK are cross-correlated and/or orthogonal to each other.

With reference to the first aspect of the present disclosure, the first implementation of the first aspect of the present disclosure, the second implementation of the first aspect of the present disclosure, the third implementation of the first aspect of the present disclosure, the fourth implementation of the first aspect of the present disclosure, or the fifth implementation of the first aspect of the present disclosure, in a sixth implementation of the first aspect of the present disclosure, the indication information is further used to indicate a data format used when the terminal device sends the downlink feedback information; and the receiving, by the base station, the downlink feedback information sent by the terminal device includes:

receiving, by the base station, the downlink feedback information that is sent by the terminal device according to the data format indicated by the indication information.

In view of this, a second aspect of the present disclosure provides a method for transmitting downlink feedback information, including:

receiving, by a terminal device, indication information sent by a base station; and sending, by the terminal device, at the target time-frequency resource location, the downlink feedback information to the base station according to the target time-frequency resource location indicated by the indication information, where the downlink feedback information is used to feed back a reception status of downlink data that should be received by the terminal device.

It should be noted that a time-frequency resource location at which a terminal device sends downlink feedback information is indicated by a base station by using indication information, and the base station can ensure, by using the indication information, that time-frequency resource locations of downlink feedback information of different downlink data are different, so as to avoid a resource conflict problem in the prior art. Therefore, in the present disclosure, it can be ensured that the base station correctly receives the downlink feedback information sent by the terminal device, thereby effectively improving a transmission success rate of the downlink feedback information.

With reference to the second aspect of the present disclosure, in a first implementation of the second aspect of the present disclosure, the method further includes:

receiving, by the terminal device, downlink scheduling information sent by the base station; and after the receiving, by a terminal device, indication information sent by a base station, the method further includes:

receiving, by the terminal device, the downlink data sent by the base station, where the downlink data is downlink data that is sent by the base station to the terminal device according to the downlink scheduling information.

With reference to the second aspect of the present disclosure, in a second implementation of the second aspect of the present disclosure, before the receiving, by a terminal device, indication information sent by a base station, the method further includes:

receiving, by the terminal device, downlink scheduling information sent by the base station; and receiving, by the terminal device, the downlink data sent by the base station, where the downlink data is downlink data that is sent by the base station to the terminal device according to the downlink scheduling information.

With reference to the second aspect of the present disclosure, the first implementation of the second aspect of the present disclosure, or the second implementation of the second aspect of the present disclosure, in a third implementation of the second aspect of the present disclosure, the sending, by the terminal device, at the target time-frequency resource location, the downlink feedback information to the base station according to the target time-frequency resource location indicated by the indication information includes:

sending, by the terminal device, at the target time-frequency resource location, the downlink feedback information to the base station according to the target time-frequency resource location indicated by the indication information, where the downlink feedback information is a sequence; and the downlink feedback information represents an acknowledgement ACK or a negative acknowledgement NACK separately by using different sequences, and a sequence that represents the ACK and a sequence that represents the NACK are cross-correlated and/or orthogonal to each other.

With reference to the second aspect of the present disclosure, the first implementation of the second aspect of the present disclosure, the second implementation of the second aspect of the present disclosure, or the third implementation of the second aspect of the present disclosure, in a fourth implementation of the second aspect of the present disclosure, the indication information is further used to indicate a data format used when the terminal device sends the downlink feedback information; and the sending, by the terminal device, at the target time-frequency resource location, the downlink feedback information to the base station according to the target time-frequency resource location indicated by the indication information includes:

sending, by the terminal device, at the target time-frequency resource location, the downlink feedback information to the base station according to the target time-frequency resource location and the data format that are indicated by the indication information.

In view of this, a third aspect of the present disclosure provides a base station, including:

a sending unit, configured to send indication information to a terminal device, where the indication information is used to indicate a target time-frequency resource location, the target time-frequency resource location is a time-frequency resource location at which the terminal device sends downlink feedback information, and the downlink feedback information is used to feed back a reception status of downlink data that should be received by the terminal device; and a receiving unit, configured to receive the downlink feedback information sent by the terminal device.

With reference to the third aspect of the present disclosure, in a first implementation of the third aspect of the present disclosure, the sending unit is further configured to send downlink scheduling information to the terminal device; and after the sending unit sends the indication information to the terminal device, the sending unit is further configured to send the downlink data to the terminal device according to the downlink scheduling information.

With reference to the third aspect of the present disclosure, in a second implementation of the third aspect of the present disclosure, the sending unit is specifically configured to send, on a physical downlink control channel PDCCH, the indication information to the terminal device, where the PDCCH includes multiple scheduling units, and the indication information alone occupies one scheduling unit on the PDCCH.

With reference to the first implementation of the third aspect of the present disclosure, in a third implementation of the third aspect of the present disclosure, the sending unit is specifically configured to send, on a physical downlink control channel PDCCH, the indication information to the terminal device, where the PDCCH includes multiple scheduling units, and the indication information shares one scheduling unit with the downlink scheduling information.

With reference to the third aspect of the present disclosure, in a fourth implementation of the third aspect of the present disclosure, the sending unit is further configured to: send downlink scheduling information to the terminal device; and send the downlink data to the terminal device according to the downlink scheduling information.

With reference to the third aspect of the present disclosure, the first implementation of the third aspect of the present disclosure, the second implementation of the third aspect of the present disclosure, the third implementation of the third aspect of the present disclosure, or the fourth implementation of the third aspect of the present disclosure, in a fifth implementation of the third aspect of the present disclosure, the receiving unit is specifically configured to receive the downlink feedback information sent by the terminal device, where the downlink feedback information is a sequence; and the downlink feedback information represents an acknowledgement ACK or a negative acknowledgement NACK separately by using different sequences, and a sequence that represents the ACK and a sequence that represents the NACK are cross-correlated and/or orthogonal to each other.

With reference to the third aspect of the present disclosure, the first implementation of the third aspect of the present disclosure, the second implementation of the third aspect of the present disclosure, the third implementation of the third aspect of the present disclosure, the fourth implementation of the third aspect of the present disclosure, or the fifth implementation of the third aspect of the present disclosure, in a sixth implementation of the third aspect of the present disclosure, the indication information is further used to indicate a data format used when the terminal device sends the downlink feedback information; and the receiving unit is specifically configured to receive the downlink feedback information that is sent by the terminal device according to the data format indicated by the indication information.

In view of this, a fourth aspect of the present disclosure provides a terminal device, including:

a receiving unit, configured to receive indication information sent by a base station; and a sending unit, configured to send, at the target time-frequency resource location, downlink feedback information to the base station according to the target time-frequency resource location indicated by the indication information, where the downlink feedback information is used to feed back a reception status of downlink data that should be received by the terminal device.

With reference to the fourth aspect of the present disclosure, in a first implementation of the fourth aspect of the present disclosure, the receiving unit is further configured to receive downlink scheduling information sent by the base station; and after the receiving unit receives the indication information sent by the base station, the receiving unit is further configured to receive the downlink data sent by the base station, where the downlink data is downlink data that is sent by the base station to the terminal device according to the downlink scheduling information.

With reference to the fourth aspect of the present disclosure, in a second implementation of the fourth aspect of the present disclosure, before the receiving unit receives the indication information sent by the base station, the receiving unit is further configured to: receive downlink scheduling information sent by the base station; and receive the downlink data sent by the base station, where the downlink data is downlink data that is sent by the base station to the terminal device according to the downlink scheduling information.

With reference to the fourth aspect of the present disclosure, the first implementation of the fourth aspect of the present disclosure, or the second implementation of the fourth aspect of the present disclosure, in a third implementation of the fourth aspect of the present disclosure, the sending unit is specifically configured to send, at the target time-frequency resource location, the downlink feedback information to the base station according to the target time-frequency resource location indicated by the indication information, where the downlink feedback information is a sequence; and the downlink feedback information represents an acknowledgement ACK or a negative acknowledgement NACK separately by using different sequences, and a sequence that represents the ACK and a sequence that represents the NACK are cross-correlated and/or orthogonal to each other.

With reference to the fourth aspect of the present disclosure, the first implementation of the fourth aspect of the present disclosure, the second implementation of the fourth aspect of the present disclosure, or the third implementation of the fourth aspect of the present disclosure, in a fourth implementation of the fourth aspect of the present disclosure, the indication information is further used to indicate a data format used when the terminal device sends the downlink feedback information; and the sending unit is specifically configured to send, at the target time-frequency resource location, the downlink feedback information to the base station according to the target time-frequency resource location and the data format that are indicated by the indication information.

Compared with the prior art, in the present disclosure, a time-frequency resource location at which a terminal device sends downlink feedback information is indicated by a base station by using indication information, and the base station can ensure, by using the indication information, that time-frequency resource locations of downlink feedback information of different downlink data are different, so as to avoid a resource conflict problem in the prior art. Therefore, in the present disclosure, it can be ensured that the base station correctly receives the downlink feedback information sent by the terminal device, thereby effectively improving a transmission success rate of the downlink feedback information.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, or persons of ordinary skill in the art may still derive other drawings from these accompanying drawings without creative efforts.

FIG. 1 is an existing transmission flowchart of downlink feedback information;

FIG. 2 is a flowchart of a method for transmitting downlink feedback information according to an embodiment of the present disclosure;

DESCRIPTION OF EMBODIMENTS

Figure 3:
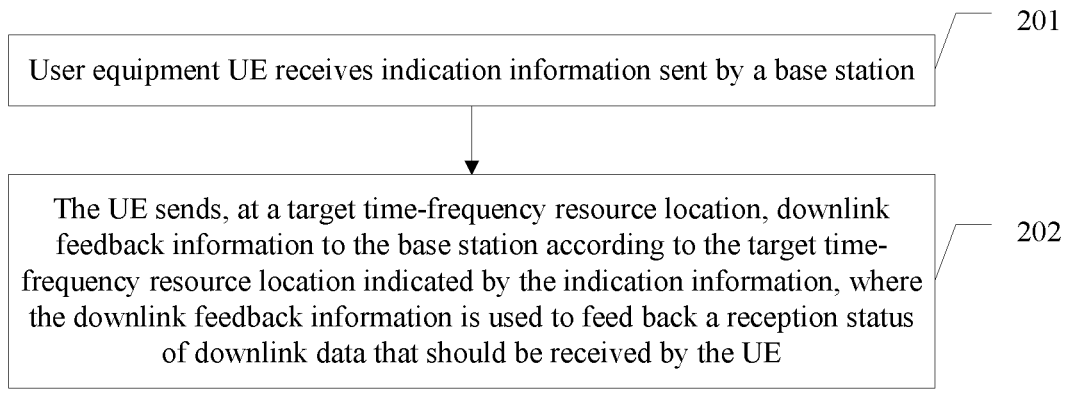
FIG. 3 is another flowchart of a method for transmitting downlink feedback information according to an embodiment of the present disclosure.

Embodiments of the present disclosure provide a method for transmitting downlink feedback information, a base station, and a terminal device, so as to resolve a problem of feedback information resource selection in a communications system in which cross-PDCCH scheduling is performed.

To make persons skilled in the art understand the technical solutions in the present disclosure better, the following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. In addition, the terms "include", "contain" and any other variants mean to cover the non-exclusive inclusion. For example, a process, method, system, product, or device that includes a list of steps or units is not necessarily limited to those units, but may include other units not expressly listed or inherent to such a process, method, system, product, or device.

Although an LTE system is used as an example for description in the foregoing background part, persons skilled in the art should know that the present disclosure not only applies to the LTE system, but also applies to other wireless communications systems, such as Global System for Mobile communications (Global System for Mobile Communication, GSM), a Universal Mobile Telecommunications System (Universal Mobile Telecommunications System, UMTS), a Code Division Multiple Access (Code Division Multiple Access, CDMA) system, and a new network system. The following describes specific embodiments by using the LTE system as an example.

A terminal device related to an embodiment of the present disclosure may refer to a device that provides a user with voice and/or data connectivity, a handheld device that has a wireless connection function, or another processing device connected to a wireless modem. The wireless terminal may communicate with one or more core networks by using a radio access network (Radio Access Network, RAN). The wireless terminal may be a mobile terminal such as a mobile phone (or referred to as a "cellular" phone), or a computer having a mobile terminal function. For example, the wireless terminal may be a portable, pocket-sized, handheld, computer built-in, or in-vehicle mobile apparatus, which exchanges voice and/or data with the radio access network. For example, the wireless terminal may be a device, such as a personal communications service (PCS, Personal Communication Service) phone, a cordless phone, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile (Mobile) terminal, a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

A base station related to this embodiment of the present disclosure may be configured to perform conversion between a received over-the-air frame and an IP packet, and serve as a router between the wireless terminal and the rest of an access network. The rest of the access network may include an Internet Protocol (IP) network. The base station may be further configured to coordinate attribute management of an air interface. For example, the base station may be a base transceiver station (BTS, Base Transceiver Station) in GSM or CDMA, may be a NodeB (NodeB) in WCDMA, or may be an evolved NodeB (eNB or e-NodeB, evolutional Node B) in LTE. This is not limited in this application.

The following describes a method for transmitting downlink feedback information in the present disclosure with reference to specific embodiments.

Referring to FIG. 2, an embodiment of the method for transmitting downlink feedback information in an embodiment of the present disclosure includes the following steps.

101. A base station sends indication information to a terminal device, where the indication information is used to indicate a target time-frequency resource location, the target time-frequency resource location is a time-frequency resource location at which the terminal device sends downlink feedback information, and the downlink feedback information is used to feed back a reception status of downlink data that should be received by the terminal device.

In this embodiment, the base station may send, on a PDCCH, the indication information to the terminal device, or the base station may send, on a PDSCH, the indication information to the terminal device.

It should be noted that the downlink data is downlink data that is sent by the base station to the terminal device in advance, and a time at which the base station sends the downlink data to the terminal device in advance may be before step 101, may be after step 101, or, if possible, may be the same as a time at which step 101 is performed. In addition, the foregoing reception status indicates whether the terminal device correctly receives the downlink data, and the time-frequency resource location includes a time location and/or a frequency location.

It should be noted that, in some embodiments of the present disclosure, the sending, by a base station, indication information to a terminal device includes:

sending, by the base station, on the PDCCH, the indication information to the terminal device, where the PDCCH includes multiple scheduling units, and the indication information alone occupies one scheduling unit.

It should be noted that the indication information that alone occupies one scheduling unit on the PDCCH may be downlink control information (Full name: Downlink Control Information, DCI for short). An example scheduling unit may include information about the time-frequency resource location, a modulation and coding scheme (Full name: Modulation and Coding Scheme, MCS for short), a code block size (Full name: Code Block Size), and a message identifier (Full name: Message Identifier, MID for short), and may further include other information, which is not listed herein. The information about the time-frequency resource location is used to indicate a time location and/or a frequency location at which a user sends the downlink feedback information. Information that indicates the time location and information that indicates the frequency location may be separately indicated, or may be indicated together. The MCS indication information and the CBS indication information are used to indicate a data format used when the user sends the downlink feedback information. For example, if the downlink feedback information needs to be processed by means of coding, modulation, and the like, the MCS information may be used to indicate a bit rate and a modulation scheme that are of the downlink feedback information, and the CBS indication information may be used to indicate a packet size of the downlink feedback information. In addition, if a form of the downlink feedback information is a sequence, the CBS indication information may be used to indicate a sequence length of the downlink feedback information. The message identifier may be used to identify a specific type of scheduling information to which the indication information belongs, such as PDSCH scheduling information, PUSCH scheduling information, or feedback information scheduling information.

102. The base station receives the downlink feedback information sent by the terminal device.

After the base station sends the indication information to the terminal device, the base station receives the downlink feedback information sent by the terminal device.

Optionally, in some embodiments of the present disclosure, the receiving, by the base station, the downlink feedback information sent by the terminal device may be specifically as follows:

receiving, by the base station, the downlink feedback information sent by the terminal device, where the downlink feedback information is a sequence; and the downlink feedback information represents an acknowledgement ACK or a negative acknowledgement NACK separately by using different sequences, and a sequence that represents the ACK and a sequence that represents the NACK are cross-correlated and/or orthogonal to each other.

For example, two sequences in a sequence group that are cross-correlated are a pseudo-random sequence 1 and a pseudo-random sequence 2, and two sequences in a sequence group that are orthogonal to each other are a Hadamard sequence 1×a Hadamard sequence 2. Another combination is further included, and details are not described herein.

In this embodiment, a time-frequency resource location at which a terminal device sends downlink feedback information is indicated by a base station by using indication information, and the base station can ensure, by using the indication information, that time-frequency resource locations of downlink feedback information of different downlink data are different, so as to avoid a resource conflict problem in the prior art. Therefore, in the present disclosure, it can be ensured that the base station correctly receives the downlink feedback information sent by the terminal device, thereby effectively improving a transmission success rate of the downlink feedback information.

The foregoing has described the technical solutions in the present disclosure from a perspective of the base station. The following describes a technical solution in the present disclosure from a perspective of the terminal device.

Referring to FIG. 3, another embodiment of a method for transmitting downlink feedback information in an embodiment of the present disclosure includes the following steps.

201. A terminal device receives indication information sent by a base station.

In this embodiment, the terminal device may receive, on a PDCCH, the indication information sent by the base station, or the terminal device may receive, on a PDSCH, the indication information sent by the base station.

202. The terminal device sends, at the target time-frequency resource location, downlink feedback information to the base station according to the target time-frequency resource location indicated by the indication information, where the downlink feedback information is used to feed back a reception status of downlink data that should be received by the terminal device.

After the terminal device receives the indication information sent by the base station, the terminal device sends, at the target time-frequency resource location, the downlink feedback information to the base station according to the target time-frequency resource location indicated by the indication information. The downlink feedback information is feedback information of the downlink data that should be received by the terminal device.

It should be noted that the downlink data is downlink data that is sent by the base station to the terminal device in advance, and a time at which the base station sends the downlink data to the terminal device in advance may be before step 201, may be after step 201, or, if possible, may be the same as a time at which step 201 is performed. In addition, the foregoing reception status indicates whether the terminal device correctly receives the downlink data.

In this embodiment, a time-frequency resource location at which a terminal device sends downlink feedback information is indicated by a base station by using indication information, and the base station can ensure, by using the indication information, that time-frequency resource locations of downlink feedback information of different downlink data are different, so as to avoid a resource conflict problem in the prior art. Therefore, in the present disclosure, it can be ensured that the base station correctly receives the downlink feedback information sent by the terminal device, thereby effectively improving a transmission success rate of the downlink feedback information.

The foregoing has described the technical solutions in the present disclosure from the perspectives of the base station and the terminal device. The following describes in detail a technical solution in the present disclosure from a perspective of interaction between the base station and the terminal device.

Figure 4:
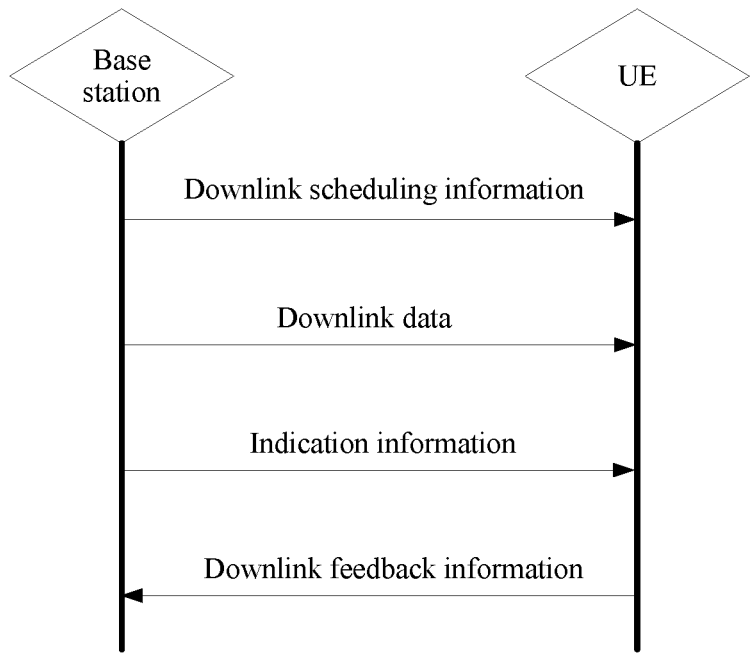
FIG. 4 is an interaction flowchart of a method for transmitting downlink feedback information according to an embodiment of the present disclosure.

Referring to FIG. 4, another embodiment of a method for transmitting downlink feedback information in an embodiment of the present disclosure includes the following steps.

301. A base station sends downlink scheduling information to a terminal device.

In this embodiment, to send downlink data to the terminal device, the base station needs to first send the downlink scheduling information to the terminal device.

302. The base station sends downlink data to the terminal device.

After the base station sends the downlink scheduling information to the terminal device, the base station sends the downlink data to the terminal device according to an indication of the downlink scheduling information.

303. The base station sends indication information to the terminal device.

After the base station sends the downlink data to the terminal device, the base station sends the indication information to the terminal device. The indication information is used to indicate a target time-frequency resource location, the target time-frequency resource location is a time-frequency resource location at which the terminal device sends the downlink feedback information, and the downlink feedback information is used to feed back a reception status of the downlink data that should be received by the terminal device.

304. The terminal device sends downlink feedback information to the base station.

After the base station sends the indication information to the terminal device, the terminal device sends, at the target time-frequency resource location, the downlink feedback information to the base station according to the target time-frequency resource location indicated by the indication information. The downlink feedback information is corresponding to the downlink data that should be received by the terminal device.

It should be noted that the indication information may be further used to indicate a data format used when the terminal device sends the downlink feedback information. Therefore, in some embodiments of the present disclosure, the sending, by the terminal device, downlink feedback information to the base station may be further specifically as follows: sending, by the terminal device, at the target time-frequency resource location, in the data format, the downlink feedback information to the base station according to the target time-frequency resource location and the data format that are indicated by the indication information.

In addition, the indication information may be used to indicate other information, which is not listed herein.

It should be noted that, in some embodiments of the present disclosure, the indication information and the downlink scheduling information are not sent in sequence; that is, the indication information and the downlink scheduling information may be sent in a same message or may be separately sent.

In this embodiment, a time-frequency resource location at which a terminal device sends downlink feedback information is indicated by a base station by using indication information, and the base station can ensure, by using the indication information, that time-frequency resource locations of downlink feedback information of different downlink data are different, so as to avoid a resource conflict problem in the prior art. Therefore, in the present disclosure, it can be ensured that the base station correctly receives the downlink feedback information sent by the terminal device, thereby effectively improving a transmission success rate of the downlink feedback information.

In addition, in this embodiment, indication information is sent to a terminal device after sending of downlink data is complete. Therefore, a process of supporting the technical solutions in the present disclosure is provided, thereby enriching the technical solutions in the present disclosure.

Figure 5:
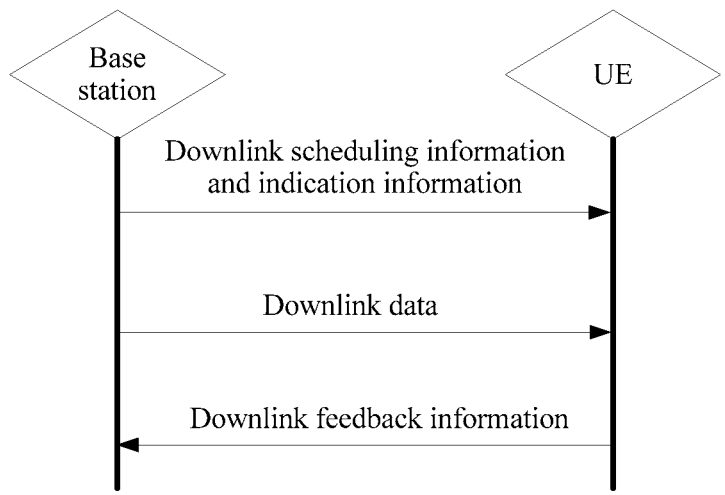
FIG. 5 is another interaction flowchart of a method for transmitting downlink feedback information according to an embodiment of the present disclosure.

Referring to FIG. 5, another embodiment of a method for transmitting downlink feedback information in an embodiment of the present disclosure includes the following steps.

401. A base station sends downlink scheduling information and indication information to a terminal device.

In this embodiment, the base station sends, on a PDCCH, the downlink scheduling information and the indication information to the terminal device. The PDCCH includes multiple scheduling units, and the indication information shares one scheduling unit with the downlink scheduling information. In addition, that the indication information shares one scheduling unit with the downlink scheduling information may be: The indication information is included in the downlink scheduling information.

It should be noted that the indication information may be placed in any PDCCH period for transmission. The base station may place the downlink scheduling information and the indication information in a same scheduling period, so that the terminal device may simultaneously obtain, in the scheduling period, the downlink scheduling information and the indication information. Certainly, if a scheduling resource in a scheduling period in which the downlink scheduling information is located is limited, the base station may alternatively place the indication information in another scheduling period. For example, the indication information is placed in a scheduling period before or after the scheduling period in which the downlink scheduling information is located.

402. The base station sends downlink data to the terminal device.

After the base station sends the downlink scheduling information to the terminal device, the base station sends the downlink data to the terminal device according to an indication of the downlink scheduling information.

403. The terminal device sends downlink feedback information to the base station.

After the terminal device receives the indication information, the terminal device sends, at a target time-frequency resource location, the downlink feedback information to the base station according to the target time-frequency resource location indicated by the indication information. The downlink feedback information is used to feed back a reception status of the downlink data that should be received by the terminal device.

It should be noted that the indication information may be further used to indicate a data format used when the terminal device sends the downlink feedback information. Therefore, in some embodiments of the present disclosure, the sending, by the terminal device, downlink feedback information to the base station may be further specifically as follows: sending, by the terminal device, at the target time-frequency resource location, in the data format, the downlink feedback information to the base station according to the target time-frequency resource location and the data format that are indicated by the indication information.

In addition, the indication information may be used to indicate other information, which is not listed herein.

In this embodiment, a time-frequency resource location at which a terminal device sends downlink feedback information is indicated by a base station by using indication information, and the base station can ensure, by using the indication information, that time-frequency resource locations of downlink feedback information of different downlink data are different, so as to avoid a resource conflict problem in the prior art. Therefore, in the present disclosure, it can be ensured that the base station correctly receives the downlink feedback information sent by the terminal device, thereby effectively improving a transmission success rate of the downlink feedback information.

In addition, in this embodiment, indication information is sent by a base station together with downlink scheduling information. Therefore, a process of supporting the technical solutions in the present disclosure is provided, thereby enriching the technical solutions in the present disclosure.

Figure 6:
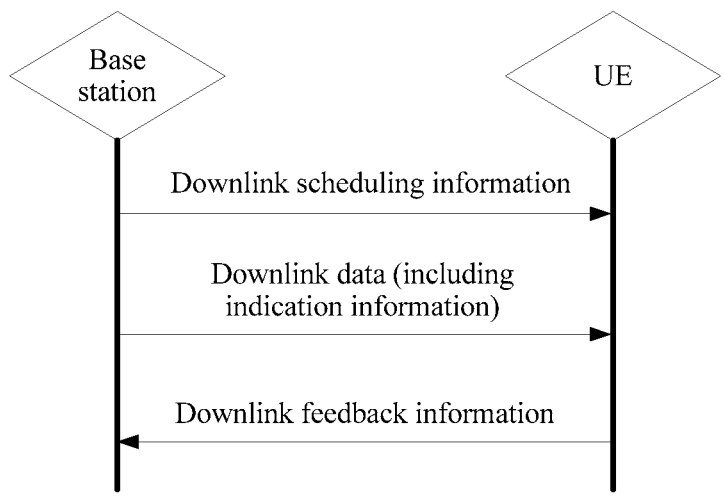
FIG. 6 is another interaction flowchart of a method for transmitting downlink feedback information according to an embodiment of the present disclosure.

Referring to FIG. 6, another embodiment of a method for transmitting downlink feedback information in an embodiment of the present disclosure includes the following steps.

501. A base station sends downlink scheduling information to a terminal device.

In this embodiment, the base station sends, on a PDCCH, the downlink scheduling information to the terminal device.

502. The base station sends downlink data to the terminal device, where the downlink data carries indication information.

The base station sends, on a PDSCH, the downlink data to the terminal device according to an indication of the downlink scheduling information. The downlink data carries the indication information.

503. The terminal device sends downlink feedback information to the base station.

After the terminal device receives the indication information, the terminal device sends, at a target time-frequency resource location, the downlink feedback information to the base station according to the target time-frequency resource location indicated by the indication information. The downlink feedback information is used to feed back a reception status of the downlink data that should be received by the terminal device.

It should be noted that the indication information may be further used to indicate a data format used when the terminal device sends the downlink feedback information. Therefore, in some embodiments of the present disclosure, the sending, by the terminal device, downlink feedback information to the base station may be further specifically as follows: sending, by the terminal device, at the target time-frequency resource location, in the data format, the downlink feedback information to the base station according to the target time-frequency resource location and the data format that are indicated by the indication information.

In addition, the indication information may be used to indicate other information, which is not listed herein.

In this embodiment, a time-frequency resource location at which a terminal device sends downlink feedback information is indicated by a base station by using indication information, and the base station can ensure, by using the indication information, that time-frequency resource locations of downlink feedback information of different downlink data are different, so as to avoid a resource conflict problem in the prior art. Therefore, in the present disclosure, it can be ensured that the base station correctly receives the downlink feedback information sent by the terminal device, thereby effectively improving a transmission success rate of the downlink feedback information.

In addition, in this embodiment, indication information is sent by a base station together with downlink data. Therefore, a process of supporting the technical solutions in the present disclosure is provided, thereby enriching the technical solutions in the present disclosure.

For ease of understanding, the following describes, by using an actual application scenario, the method for transmitting downlink feedback information in this embodiment of the present disclosure.

A base station sends, on a PDCCH, downlink scheduling information to a terminal device. The base station sends downlink data to the terminal device according to an indication of the downlink scheduling information. After the base station sends the downlink data to the terminal device, the base station sends indication information to the terminal device. The indication information alone occupies one scheduling unit, the scheduling unit includes information about a time-frequency resource location, MCS information, and CBS information, and the MCS information and the CBS information are used to indicate a data format used when the terminal device sends the downlink feedback information. After receiving the indication information, the terminal device parses the indication information, and feeds back the downlink feedback information to the base station according to the time-frequency resource location and the data format that are indicated by the indication information.

In the foregoing embodiments, the base station indicates in real time a time-frequency resource location and a sending format that are of the downlink feedback information. In addition, a scheme of fixed resource mapping may be used. Specifically:

In the downlink feedback information sent by the terminal device, a signal form may be a sequence. Therefore, an ACK and a NACK may be separately represented by using different sequences. If the terminal device successfully receives the downlink data, the terminal device needs to feed back the ACK, that is, the terminal device sends a sequence that represents the ACK; or if the terminal device fails to receive the downlink data, the terminal device needs to feed back the NACK, that is, the terminal device sends a sequence that represents the NACK. In addition, the sequence that represents the ACK and the sequence that represents the NACK should be cross-correlated and/or orthogonal to each other, such as a pseudo-random sequence, a Hadamard sequence, or a product sequence of a pseudo-random sequence and a Hadamard sequence.

For determining of the time-frequency resource location, after receiving the downlink data, the terminal device determines, according to an end moment of the downlink data, an available feedback information resource block that is closest in time, and then determines the time-frequency resource location of the downlink feedback information according to a start control channel element (Control Channel Element, CCE) resource location of scheduling information of the downlink data.

For determining of the downlink feedback information, sequences used for representing the ACK and the NACK fed back by the terminal device are related to a start frame number of a scheduling period in which the downlink scheduling information of the downlink data of the terminal device is located. For the downlink data scheduled in different scheduling periods, sequences used for representing the ACK and the NACK fed back are different, and are cross-correlated or orthogonal to each other.

Generally, the terminal device determines the time-frequency location of the downlink feedback information according to the end moment of the downlink data, or the terminal device determines the time-frequency location of the downlink feedback information according to the end moment of the downlink data and the start CCE resource location of downlink control information (Downlink Control Information, DCI) of the scheduled downlink data, and selects, according to the start frame number of the scheduling period in which the DCI of the scheduled downlink data is located, different sequences to represent the ACK and the NACK.

In the foregoing scheme of fixed resource mapping, code division processing is performed, based on different DCI periods, on sequences that represent an ACK and a NACK. Even if downlink feedback information that is of a terminal device and that is in different DCI periods collides, because of code division, no interference will occur, thereby ensuring that the downlink feedback information is correctly received.

Figure 7:
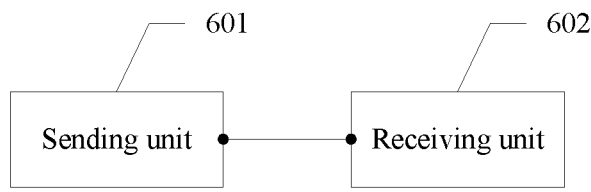
FIG. 7 is a schematic structural diagram of a base station according to an embodiment of the present disclosure.

The following describes a base station in an embodiment of the present disclosure. Referring to FIG. 7, an embodiment of the base station in an embodiment of the present disclosure includes:

a sending unit 601, configured to send indication information to a terminal device, where the indication information is used to indicate a target time-frequency resource location, the target time-frequency resource location is a time-frequency resource location at which the terminal device sends downlink feedback information, and the downlink feedback information is used to feed back a reception status of downlink data that should be received by the terminal device; and a receiving unit 602, configured to receive the downlink feedback information sent by the terminal device.

In this embodiment, a time-frequency resource location at which a terminal device sends downlink feedback information is indicated by a sending unit 601 by using indication information, and the sending unit 601 can ensure, by using the indication information, that time-frequency resource locations of downlink feedback information of different downlink data are different, so as to avoid a resource conflict problem in the prior art. Therefore, in the present disclosure, it can be ensured that a base station correctly receives the downlink feedback information sent by the terminal device, thereby effectively improving a transmission success rate of the downlink feedback information.

Optionally, in some embodiments of the present disclosure, the sending unit 601 is further configured to: send downlink scheduling information to the terminal device; and send the downlink data to the terminal device according to the downlink scheduling information. Further, in some embodiments of the present disclosure, the sending unit 601 is specifically configured to send, on a physical downlink control channel PDCCH, the indication information to the terminal device. The PDCCH includes multiple scheduling units, and the indication information alone occupies one scheduling unit on the PDCCH.

Optionally, in some embodiments of the present disclosure, the sending unit 601 is further configured to send downlink scheduling information to the terminal device; and after sending the indication information to the terminal device, the sending unit 601 is further configured to send the downlink data to the terminal device according to the downlink scheduling information. Further, in some embodiments of the present disclosure, the sending unit 601 is specifically configured to send, on a physical downlink control channel PDCCH, the indication information to the terminal device. The PDCCH includes multiple scheduling units, and the indication information shares one scheduling unit with the downlink scheduling information. That the indication information shares one scheduling unit with the downlink scheduling information includes: The indication information is included in the downlink scheduling information.

Optionally, in some embodiments of the present disclosure, the receiving unit 602 is specifically configured to receive the downlink feedback information sent by the terminal device, where the downlink feedback information is a sequence; and the downlink feedback information represents an acknowledgement ACK or a negative acknowledgement NACK separately by using different sequences, and a sequence that represents the ACK and a sequence that represents the NACK are cross-correlated and/or orthogonal to each other.

Optionally, in some embodiments of the present disclosure, the indication information is further used to indicate a data format used when the terminal device sends the downlink feedback information, and the receiving unit 602 is specifically configured to receive the downlink feedback information that is sent by the terminal device according to the data format indicated by the indication information.

Figure 8:
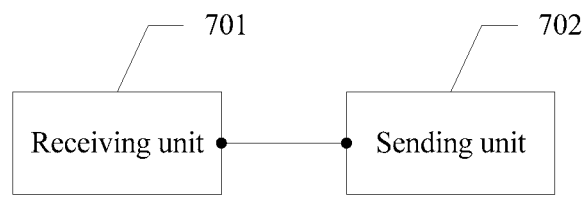
FIG. 8 is a schematic structural diagram of a terminal device according to an embodiment of the present disclosure.

The following describes a terminal device in the present disclosure. Referring to FIG. 8, an embodiment of the terminal device in an embodiment of the present disclosure includes:

a receiving unit 701, configured to receive indication information sent by a base station; and a sending unit 702, configured to send, at a target time-frequency resource location, downlink feedback information to the base station according to the target time-frequency resource location indicated by the indication information, where the downlink feedback information is used to feed back a reception status of downlink data that should be received by the terminal device.

In this embodiment, a time-frequency resource location at which a sending unit 702 sends downlink feedback information is indicated by a base station by using indication information, and the base station can ensure, by using the indication information, that time-frequency resource locations of downlink feedback information of different downlink data are different, so as to avoid a resource conflict problem in the prior art. Therefore, in the present disclosure, it can be ensured that the base station correctly receives the downlink feedback information sent by a terminal device, thereby effectively improving a transmission success rate of the downlink feedback information.

Optionally, in some embodiments of the present disclosure, before the receiving unit 701 receives the indication information sent by the base station, the receiving unit 701 is further configured to: receive downlink scheduling information sent by the base station; and receive the downlink data sent by the base station. The downlink data is downlink data that is sent by the base station to the terminal device according to the downlink scheduling information.

Optionally, in some embodiments of the present disclosure, after the receiving unit 701 receives the indication information sent by the base station, the receiving unit 701 is further configured to receive the downlink data sent by the base station. The downlink data is downlink data that is sent by the base station to the terminal device according to downlink scheduling information.

It should be noted that, in some embodiments of the present disclosure, the indication information and the downlink scheduling information are not sent in sequence; that is, the indication information and the downlink scheduling information may be sent in a same message or may be separately sent.

Optionally, in some embodiments of the present disclosure, the sending unit 702 is specifically configured to send, at the target time-frequency resource location, the downlink feedback information to the base station according to the target time-frequency resource location indicated by the indication information, where the downlink feedback information is a sequence; and the downlink feedback information represents an acknowledgement ACK or a negative acknowledgement NACK separately by using different sequences, and a sequence that represents the ACK and a sequence that represents the NACK are cross-correlated and/or orthogonal to each other.

Optionally, in some embodiments of the present disclosure, the indication information is further used to indicate a data format used when the terminal device sends the downlink feedback information, and the sending unit 702 is specifically configured to send, at the target time-frequency resource location, in the data format, the downlink feedback information to the base station according to the target time-frequency resource location and the data format that are indicated by the indication information.

For ease of understanding, the following describes, by using an actual application scenario, interaction between the base station and the units in the terminal device in the embodiments of the present disclosure.

The sending unit 601 sends, on a PDCCH, downlink scheduling information to a terminal device, and sends downlink data to the terminal device according to an indication of the downlink scheduling information. After sending the downlink data to the terminal device, the sending unit 601 sends indication information to the receiving unit 701. The indication information alone occupies one scheduling unit, the scheduling unit includes information about a time-frequency resource location, MCS information, and CBS information, and the MCS information and the CBS information are used to indicate a data format used when the sending unit 702 sends downlink feedback information. After receiving the indication information, the receiving unit 701 parses the indication information; and the sending unit 702 feeds back the downlink feedback information to the receiving unit 602 according to the time-frequency resource location and the data format that are indicated by the indication information.

Figure 9:
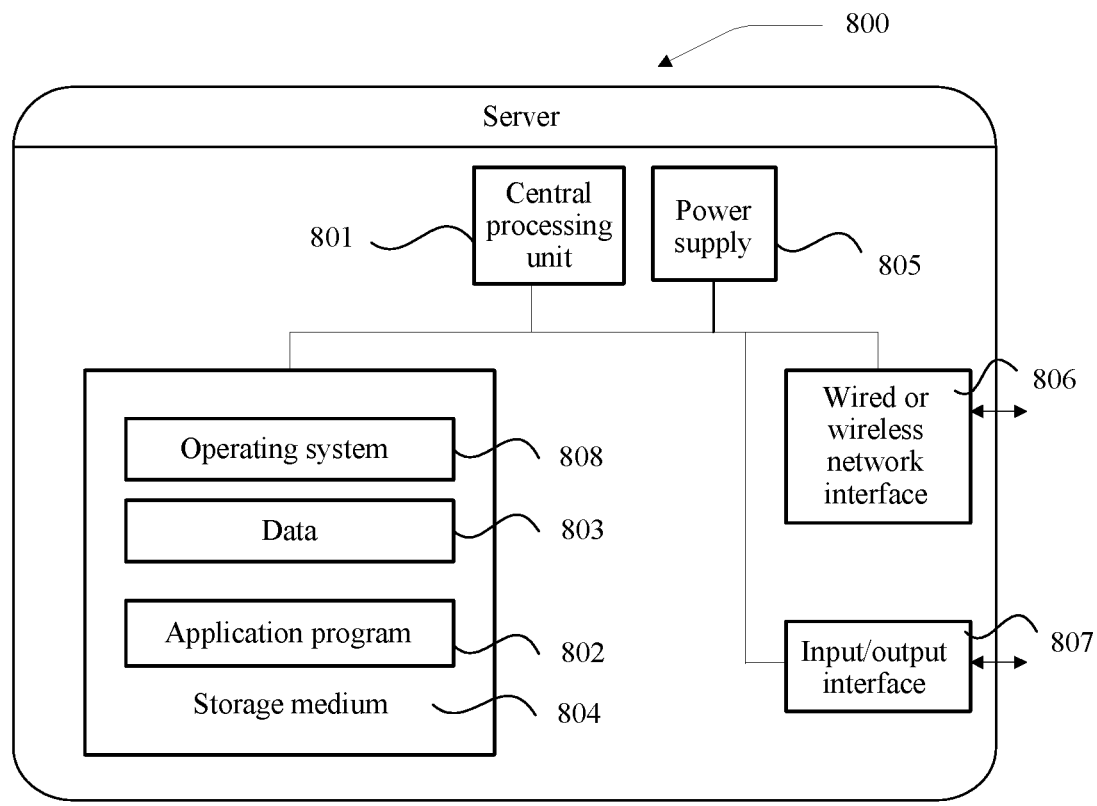
FIG. 9 is a schematic structural diagram of a server according to an embodiment of the present disclosure.

An embodiment of the present disclosure further provides a server. Referring to FIG. 9, an embodiment of the server in an embodiment of the present disclosure includes:

FIG. 9 is a schematic structural diagram of the server according to this embodiment of the present disclosure. The server 800 may have a relatively big difference because of a difference in configuration or performance, and may include one or more central processing units (central processing units, CPU) 801 (for example, one or more processors), and one or more storage media 804 (for example, one or more mass storage devices) that store an application program 802 or data 803. The storage medium 804 may be a transient storage or a persistent storage. A program stored in the storage medium 804 may include one or more modules (not shown in FIG. 9), and each module may include a series of instruction operations to be performed on a switch. Further, the central processing unit 801 may be configured to communicate with the storage medium 804 to perform, on the server 800, a series of instruction operations in the storage medium 804.

The server 800 may further include one or more power supplies 805, one or more wired or wireless network interfaces 806, one or more input/output interfaces 807, and/or one or more operating systems 808, such as Windows Server, Mac OS X, Unix, Linux, or FreeBSD.

In the foregoing embodiment, the steps performed by the base station may be based on the server structure shown in FIG. 9.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method for receiving downlink feedback information, performed by a base station, comprising:

sending single downlink control information (DCI) to a terminal device on a physical downlink control channel (PDCCH), wherein the single DCI includes:
  downlink scheduling information that schedules downlink data,
  first information that indicates a time location of a resource for acknowledgement/negative acknowledgement (ACK/NACK) in response to the downlink data, and
  second information separated from the first information that indicates a frequency location of the resource for the ACK/NACK in response to the downlink data;
sending the downlink data to the terminal; and
receiving the ACK/NACK in response to the downlink data from the terminal according to the time location and the frequency location.

2. The method according to claim 1, wherein the ACK/NACK is a first sequence or a second sequence, the first sequence represents ACK, the second sequence-represents NACK, and the first sequence and the second sequence are orthogonal to each other.

3. The method according to claim 2, wherein the single DCI further comprises information indicating a data format for the ACK/NACK.

4. The method according to claim 3, wherein the single DCI further comprises MCS information indicating a bit rate and a modulation scheme of the ACK/NACK.

5. A method for transmitting downlink feedback information, performed by a terminal device, comprising:
  receiving single downlink control information (DCI) from a base station on a physical downlink control channel (PDCCH), wherein the single DCI includes
    downlink scheduling information that schedules downlink data,
    first information that indicates a time location of a resource for acknowledgement/negative acknowledgement (ACK/NACK) in response to the downlink data, and
    second information separated from the first information that indicates a frequency location of the resource for the ACK/NACK in response to the downlink data;
  receiving the downlink data from the base station; and
  sending the ACK/NACK in response to the downlink data to the base station according to the time location and the frequency location.

6. The method according to claim 5, wherein the ACK/NACK information is a first sequence or a second sequence, the first sequence represents ACK, the second sequence represents NACK, and the first sequence and the second sequence are orthogonal to each other.

7. The method according to claim 6, wherein the single DCI further comprises information indicating a data format for the ACK/NACK.

8. The method according to claim 7, wherein the single DCI further comprises MCS information indicating a bit rate and a modulation scheme of the ACK/NACK.

9. A base station, comprising:
  a processor; and
  a non-transitory storage coupled to the processor, including instructions, when executed by the processor, causing the base station to perform steps comprising:
    sending single downlink control information (DCI) to a terminal device on a physical downlink control channel (PDCCH), wherein the single DCI includes
      downlink scheduling information that schedules downlink data,
      first information that indicates a time location of a resource for acknowledgement/negative acknowledgement (ACK/NACK) in response to the downlink data, and
      second information separated from the first information that indicates a frequency location of the resource for the ACK/NACK in response to the downlink data;
    sending the downlink data to the terminal; and
    receiving the ACK/NACK in response to the downlink data from the terminal according to the time location and the frequency location.

10. The base station according to claim 9, wherein the ACK/NACK is a first sequence or a second sequence, the first sequence represents ACK, the second sequence represents NACK, and the first sequence and the second sequence are orthogonal to each other.

11. The base station according to claim 10, wherein the single DCI further comprises information indicating a data format for the ACK/NACK.

12. The base station according to claim 11, wherein the single DCI further comprises MCS information indicating a bit rate and a modulation scheme of the ACK/NACK.

13. A terminal device, comprising:
  a processor; and
  a non-transitory storage coupled to the processor, including instructions, when executed by the processor, causing the terminal device to perform steps comprising:
    receiving single downlink control information (DCI) from a base station on a physical downlink control channel (PDCCH), wherein the single DCI including downlink scheduling information that schedules downlink data,
    receiving first information that indicates a time location of a resource for acknowledgement/negative acknowledgement (ACK/NACK) in response to the downlink data, and second information separated from the first information that indicates a frequency location of the resource for the ACK/NACK in response to the downlink data;
    receiving the downlink data from the base station;
    sending the ACK/NACK in response to the downlink data to the base station according to the time location and the frequency location.

14. The terminal device according to claim 13, wherein the ACK/NACK is a first sequence or a second sequence, the first sequence represents ACK, the second sequence represents NACK, and the first sequence and the second sequence are orthogonal to each other.

15. The terminal device according to claim 14, wherein the single DCI further comprises information indicating a data format for the ACK/NACK.

16. The method according to claim 15, wherein the single DCI further comprises MCS information indicating a bit rate and a modulation scheme of the ACK/NACK.

17. A communication system, comprising:
  a base station, configured to:
    send single downlink control information (DCI) to a terminal device on a physical downlink control channel (PDCCH), wherein the single DCI includes
      downlink scheduling information that schedules downlink data,
      first information that indicates a time location of a resource for acknowledgement/negative acknowledgement (ACK/NACK) in response to the downlink data, and second information separated from the first information that indicates a frequency location of the resource for the ACK/NACK in response to the downlink data;

send the downlink data to the terminal; and receive the ACK/NACK in response to the downlink data from the terminal according to the time location and the frequency location;

the terminal device, configured to receive the single DCI from the base station;

receive the downlink data from the base station;

send the ACK/NACK in response to the downlink data to the base station according to the time location and the frequency location.

18. The system according to claim 17, wherein the ACK/NACK is a first sequence or a second sequence, the first sequence represents ACK, the second sequence represents NACK, and the first sequence and the second sequence are orthogonal to each other.

19. The system according to claim 18, wherein the single DCI further comprises information indicating a data format for the ACK/NACK.

20. The system according to claim 19, wherein the single DCI further comprises MCS information indicating a bit rate and a modulation scheme of the ACK/NACK.

* * * * *